(12) United States Patent
Sohrabi

(10) Patent No.: US 9,193,242 B2
(45) Date of Patent: Nov. 24, 2015

(54) AIR SHOCK ABSORBER WITH SMART SUSPENSION SYSTEM WITH HEIGHT ADJUSTMENT WITHOUT LOSING COMFORT AND SAFETY

(71) Applicant: Saber Sohrabi, Zanjan (IR)

(72) Inventor: Saber Sohrabi, Zanjan (IR)

(*) Notice: Subject to any disclaimer, the term of this patent is extended or adjusted under 35 U.S.C. 154(b) by 0 days.

(21) Appl. No.: 14/016,123

(22) Filed: Sep. 1, 2013

(65) Prior Publication Data
US 2015/0061243 A1 Mar. 5, 2015

(51) Int. Cl.
*B60G 15/12* (2006.01)
*B60G 13/08* (2006.01)
*B60G 13/10* (2006.01)
*B60G 17/08* (2006.01)

(52) U.S. Cl.
CPC .............. *B60G 15/12* (2013.01); *B60G 13/08* (2013.01); *B60G 13/10* (2013.01); *B60G 17/08* (2013.01); *B60G 2202/242* (2013.01); *B60G 2500/30* (2013.01)

(58) Field of Classification Search
CPC ................ B60G 2400/252; B60G 2202/152; B60G 17/0155; B60G 17/0525; B60G 15/12
USPC .......... 280/5.514, 5.515, 5.507, 6.157, 6.159; 267/64.15, 64.24–64.28
See application file for complete search history.

(56) References Cited

U.S. PATENT DOCUMENTS

| | | | | |
|---|---|---|---|---|
| 3,687,481 A | * | 8/1972 | Graef | 280/6.159 |
| 4,381,857 A | * | 5/1983 | Cook | 267/64.15 |
| 4,396,202 A | * | 8/1983 | Kami et al. | 280/6.157 |
| 4,506,869 A | * | 3/1985 | Masclet et al. | 267/64.15 |
| 5,148,896 A | * | 9/1992 | Ralph | 188/314 |
| 5,150,917 A | * | 9/1992 | Kawabata | 280/5.507 |
| 5,222,759 A | * | 6/1993 | Wanner et al. | 280/5.515 |
| 5,624,105 A | * | 4/1997 | Runkel | 267/64.15 |
| 6,311,961 B1 | * | 11/2001 | Julia | 267/64.17 |
| 6,698,729 B2 | * | 3/2004 | Popjoy | 267/64.28 |
| 2004/0232606 A1 | * | 11/2004 | Timoney et al. | 267/64.26 |
| 2009/0200760 A1 | * | 8/2009 | Gartner et al. | 280/5.507 |
| 2010/0270761 A1 | * | 10/2010 | Azekatsu | 280/5.514 |
| 2011/0101579 A1 | * | 5/2011 | Polakowski et al. | 267/64.26 |

* cited by examiner

*Primary Examiner* — James English
(74) *Attorney, Agent, or Firm* — Azadeh Saidi

(57) ABSTRACT

The smart suspension is compilation of air coils (air cylinder and air piston) as well as smart hydraulic shock absorber that in respect their roles are making comfort and improving vehicles balance. Regardless of the vehicle, the height adjustment system being used in smart suspension, adjusts the height and has the ability to drive in any desirable heights without losing a bit of comfort and safety (lowest to the highest elevations). There are two manual and automatic height adjustment systems, automatic system is being activated by disembarking passengers and manual system is set using the electronic key. These changes can range from 1 mm to 20 cm which in both conditions there would be no change in safety or any uncomfortable feeling.

8 Claims, 2 Drawing Sheets

AIR SHOCK ABSORBER WITH SMART SUSPENSION SYSTEM WITH HEIGHT ADJUSTMENT WITHOUT LOSING COMFORT AND SAFETY

BACKGROUND OF THE INVENTION

Hydraulic suspension systems are similar inventions, they all act as an active body control and can adjust the height, which big companies all around the world put their own name on them such as ABC or Active Body Control. There has been 6 decades since its generation, but the evolution continues until the difficulties to be solved.

Idea of using Hydraulic systems for vehicles suspension mechanism was first discussed in Citroen Car Company in 1952. Designers of this company used all hydraulic mechanisms ever invented in manufacturing the Citroen DS219.

The principles of hydraulic suspension system, sometimes known as hydro pneumatic, are based on compressibility of gases and non-compressibility of liquids. Each used kickstand being used in suspension system replacing normal springs/coils consists of one simple cylinder, one simple piston, and one storage or warehouse which is under pressure of nitrogen gas and is being installed on top of the kickstand.

Hydraulic oil can move back and forth between kickstand and storage. The auto body weight causes piston rise in cylinder resulting oil emission from kickstand and its entrance to the storage. With the addition of oil into the store, nitrogen gas-locked inside-density increases in order to reach equilibrium with the weight of the car.

Thus the locked nitrogen gas acts like a coil/spring. By placing an orifice (narrow channel) between piston and storage we can decrease the velocity in pistons and absorb the uneven impact impulses—in conventional vehicles this action is carried out by shock absorbers.

But the system has some shortcomings and weaknesses as follow:
   High maintenance costs
   High production costs
   Vehicle confusion in consecutive loops
   Malfunctioning in bumps in high speeds
   Using significant portion of motor energy on system performance
   Debility in adjusting the vehicle's height as it is moving or lack of driving ability at different heights (according to manufacturers, this system can adjust vehicles height but due to the loss of driving comfort and safety cannot move other than the standard heights).

In this system, each of the four Shock Absorbers and springs/coils are individually controlled by electronic control unit. In this case, the sensors mounted in each wheel give the momentary reports about the vehicle and state of the road to the control unit. Thus, comparing to vehicles using ABC, the vehicles that are equipped with this system have lower fuel consumption and more power engine. For a better understanding, in stable auto conditions (such as highways, straight paths) using signals from sensors the system sends commands which could increase the flexibility of air coils and cause superior comfort.

However if the sensors transmit information including imbalance vehicle or entering a hairpin, the control unit takes control of each four wheel, the coils/springs, and shock absorbers in order to pass the encountered crisis. Another advantage of this system is that when the driver is forced to make a severe and sudden brake the system prevents the front parts of the car to move downwards and keeps the car balanced.

Scientific basis of this system is the centrifugal force. Due to the effect of this force, cars tend to reduce height in every curve and falloff the path. If we could stop the height reduction then we can prevent misbalancing and falling-off's as well.

In this system each wheel and coil are being checked individually and are equipped with a smart barometer.

In other words, although it is a great comfort it also provides safety to the vehicle. On the other hand this system is capable of driving in any desirable height without loss of comfort and safety.

DETAILED DESCRIPTION OF PREFERRED EMBODIMENT

Figure 1:
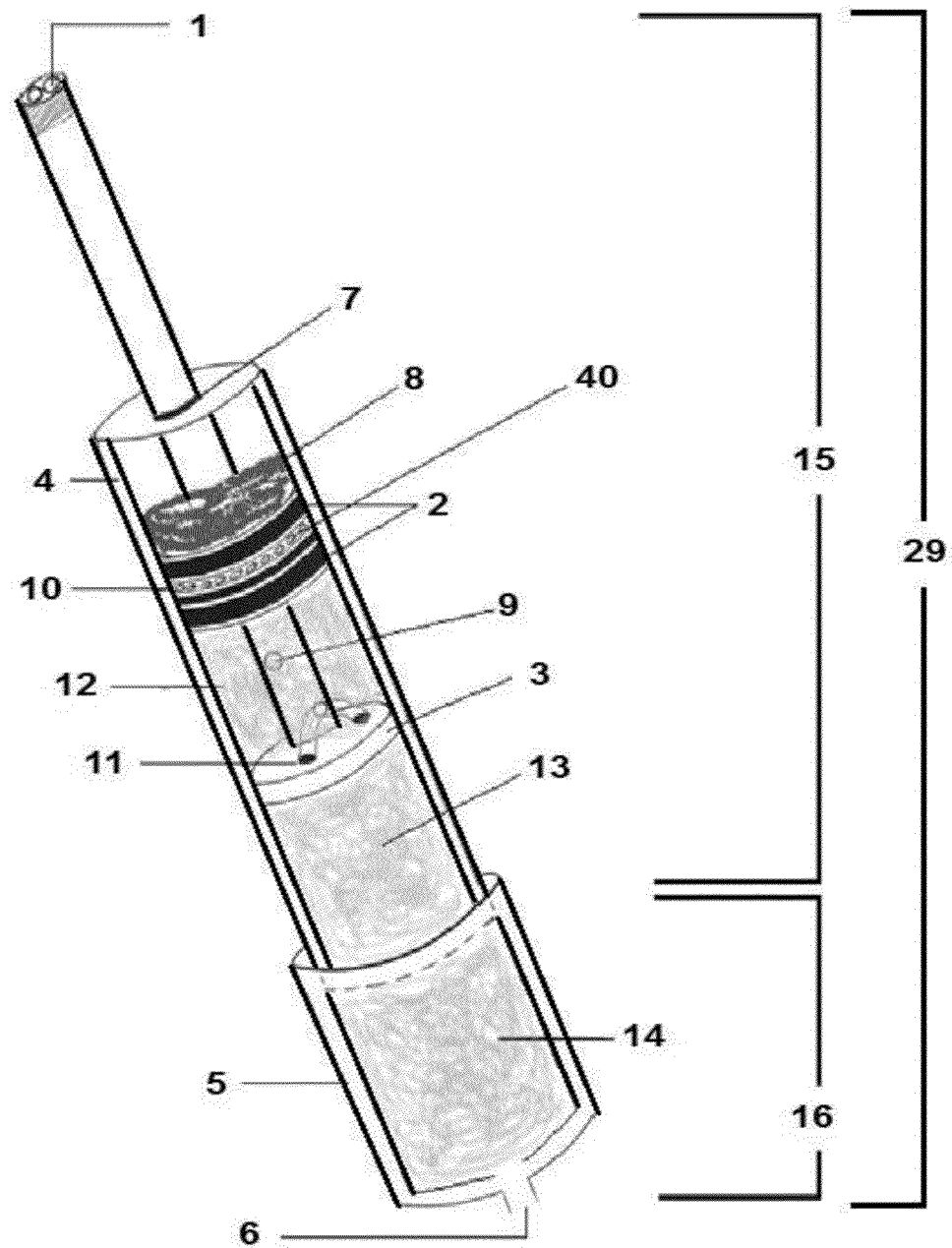
FIG. 1; is a smart air shock absorber system that components are presented individually.
Figure 2:
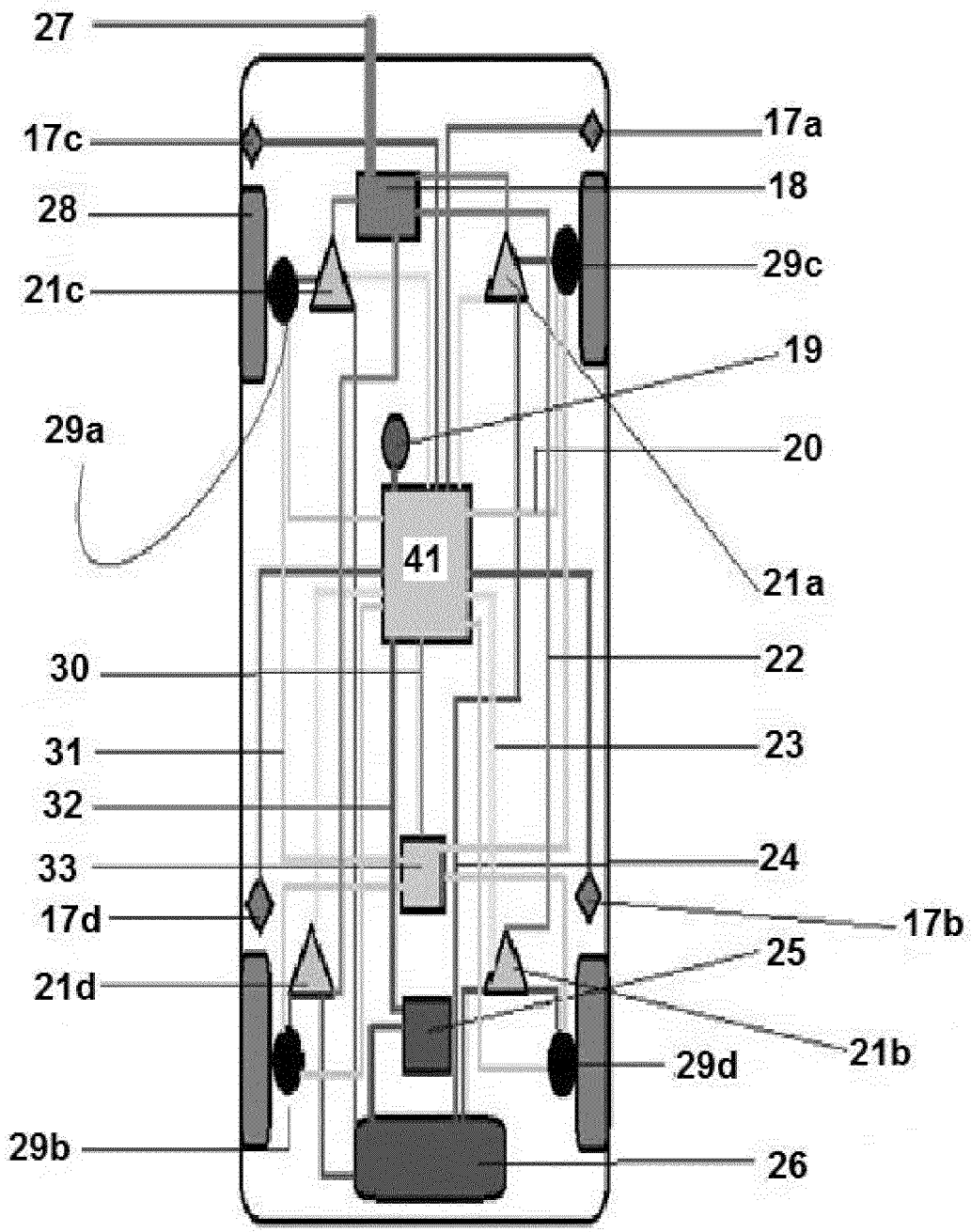
FIG. 2; Represents the relationship between system components and electronic control unit (ECU).

The main objective of this invention is to improve safety and bring balance to the vehicle in any conditions and also we should mention that this comfort comes with balance. On the other hand adding height adjustment ability doesn't reduce safety and comfort of the passengers.

This system delays the vehicle to reach the critical point by keeping safety and comfort together (the point after that the vehicle rollovers). It means vehicles equipped with this system won't rollover.

Comfort and safety are two main components in suspension systems that are incompatible with one another; it means increasing one component will cause another to decrease.

Another objective is keeping comfort in any conditions. The vehicle comes with grate comfort since air coils are being used in this system. But because of the variable valves used in it, there would be no change in the vehicle's safety.

One of the other goals here would be driving in any desirable heights without losing comfort or safety. In current systems equipped with adjustable height, length of the coils change respectively that would reduce the safety of the vehicle; but the height adjustment system operates separately, so both comfort and safety remains intact.

LIST OF SUSPENSION ELEMENTS

1: Smart barometer junction: it is located in the upper part of the shock absorber (29*a*, 29*b*, 29*c* and 29*d*) and being used to compress air into the shock absorber.
2: Packing rubber: which is a wider kind of O-ring seals; will seals the space between air cylinder 4 and air piston 40.
3: Oil Piston: this part is responsible for maintenance valves 11.
4: Air cylinder: This item is used for storage of air in shock absorber and is a place for movement of air piston 40.
5: Body of kickstand: this item is a place for movement of the shock absorber 29 (29*a*, 29*b*, 29*c* and 29*d*) inside it and leads to height adjustment.
6: Entrance or exit for kickstand oil: by oil entering into the body of kickstand 5 the height of coils/springs and shock absorbers increases. By oil exclusion the height decreases. Consequently, since coil/spring height never change, the comfort and safety of the vehicle remains intact.

7: O-ring: this item is used for sealing top of shock absorber 29 (29a, 29b, 29c and 29d).
8: Oil: its task is to oil air piston 40.
9: Input air to the air cylinder: its location is in air cylinder 4 and is used as air entrance or exclusion for cylinder 4.
10: Oil ring: its task is to oil air piston 40 with oil 8.
11: Smart valves: these valves come in different kind and may vary according to the vehicles conditions, and also are responsible for the vehicles comfort.
12: Compressed air: This air plays role of coil in this shock absorber.
13: Fluid (or oil) of shock absorber: this item lubricates the oil piston 3 and helps keeping safety and comfort with the smart valves 11.
14: Fluid or oil of kickstand: this item enters and exits in and out of the body of kickstand 5 which leads to height adjustment.
15: Set of shock absorbers without the kickstand: This item keeps the suspension of automobile in place and maintains the safety and comfort of automobile and its passengers and adjusts the height automatically.
16: Set of kickstand: This part includes body of kickstand 5 and the lower part of the body of shock absorbers set without the kickstand 15. It is used for manual height adjustment.
17a, 17b, 17c and 17d sensors: these pieces send momentary information about road and vehicles condition to the control unit 41.
18: Exhaust: this part is responsible for silent departure of compressed air 12 out of the shock absorbers 29 (29a, 29b, 29c and 29d).
19: Manual height adjustment chassis: by his chassis height adjustment is done manually.
20: Control cables of smart valves 11: it connects smart valves 11 to control unit 41.
21a, 21b, 21c and 21d smart barometer: it checks shock absorber's pressure of air cylinder 4.
22: Air pipe to the exhaust from shock absorber: shock absorbers 29 (29a, 29b, 29c, 29d) and exhaust 18 connector. This part is a way to offloading air from shock absorbers 29 (29a, 29b, 29c, 29d) to exhaust 18.
23: control cable of Smart barometer: these cables connect smart barometers 21 (21a, 21b, 21c and 21d) and control unit 41.
24: Air transmission pipes: these pipes transfer compressed air from air tank 26 into the shock absorbers 29 (29a, 29b, 29c and 29d).
25: Air pump: This device is responsible for air compression and transfers it into the air tank 26.
26: Compression air tank: this is the place to store compressed air.
27: Evacuation pipe of exhaust: this part transfers air from exhaust 18 to the environment. It is a separate pipe from the air pipe to the exhaust from the shock absorber 29.
28: Tire: The car weight is on this part.
29a, 29b, 29c and 29d shock absorbers set: these absorber sets include set of shock absorber without kickstand 15 and set of kickstand 16. Therefore they perform the functionality of both elements 15 and 16 as a unit.
30: Control cable of oil pump: this cable connects oil pump 33 and control unit 41.
31: Oil transmission pipes: this pipe transfer's oil pump 33 and kickstand 16.
32: Control cable of air pump: this cable connects air pump 25 and control unit 41.
33: Oil pump: this piece is responsible for pumping oil into kickstand 16 in order to increase the height.
40: air piston
41: control unit: this part controls all parts of the system.

DETAILED DESCRIPTION OF THE PREFERRED EMBODIMENT

For better understanding, we will illustrate the system performance from the beginning—embarking passengers—till the vehicles enters road curve:

After embarking and additional weight imposture on the vehicle, the air piston 40 decreases the volume of air cylinder 4 which leads to increase in the pressure of the compressed air 12 in the air cylinder 4 and activates the smart barometers 21a, 21b, 21c and 21d. Since the smart barometers detect the passengers embarking and the decrease in vehicle's height, it sends some information to the control unit 41; control unit 41 then sends compressed air into the air pipes 24 from air tank 26 into the air cylinder 4. With this command the vehicle's height returns into its first mode.

This will be vice versa when disembarking happens. It means, because of the high pressure air in the cylinder 4 and the air piston 40 tends to rise and increase the volume of air cylinder 4 and decreases the air pressure. In this situation the height of the vehicle will increase as well, and consequently; as a result smart barometers 21a, 21b, 21c and 21d evacuate air from the air cylinder 4 into the exhaust 18, using special pipes 22 (by control of control unit 41). Now the height goes back to normal.

Till now all height adjusting was automatic (the driver didn't have any control over it)—due to the constant coil length the height was balanced. On the other hand, this vehicle is capable of being controlled/adjusted manually.

Since by adjusting the height, the coils length would be affected as well (the length of the coils is an important component in the vehicles balance and comfort), in other suspension systems with manually adjustable height the comfort sacrificed for height adjustment.

But in this system—manual—the coil and the shock absorber set 15 are separated so that any change in the height won't affect the coil's length (series of hydraulic kickstands 16). That is, if the driver decided to increase (or decrease) the height of their vehicle, they would activate the vehicle's oil pump 33 by pressing just a chassis 19 that connects to the control unit 41; and oil 14 will be pumped through special pipes 31 or kickstand 16 via entrance or exclusion for kickstand oil 6. When oil 14 enters into the kickstand 16 an increase in the pressure of oil 14 is displayed (this pressure is delivered from oil pump 33) and leads to move up the shock absorbers set 15 and therefore increase the height.

In the height reduction mode, oil 14 exits out from kickstand 16 and the explanation above is reversed. By pressing chassis 19 and evacuating the kickstand oil 14 during reducing the height, the coil and shock absorber will also reduce in length, and again the comfort and safety remains intact.

In other words, this time the length of the coils and shock absorbers at any desired heights will not sacrifice for comfort and safety. Yet another advantage of this system is the ability to balance the vehicles in varied conditions.

Imagine the vehicle enters a curve to the right side; in other suspension systems due to the centrifugal force, the right side rises and the left side of the vehicles reduces in the height, so the vehicle would lose its balance. But in this system everything differs because of the smart shock absorbers.

In other suspension systems, there are some shock absorbers in every valve that helps the liquid move in these valves. Much larger valves, comes with great comfort and of course less balance; instead, smaller valves decrease the comfort and increase the balance of the vehicle. But in this system the system automatically varies the size of the valves in order to control them.

Let's get back to the above example, by entering into the curve the mounted sensors 17a, 17b, 17c and 17d report the situation to the control unit 41; as a result, the control unit 41 decides to constrict or even close the smart valve 11 of the left shock absorbers 29c and 29d in order to avoid decrease in the left side's height; and loosens the right valves so that the vehicle could keep its balance.

But under normal conditions, such as highways with almost no curves, according to the reports from sensors the system decides to automatically loose the valves—all wheels—in order to bring great comfort.

However during sudden braking (sent by sensors) the system automatically constricts the front shock absorbers 29b and 29d so that prevent sudden change in the height and keep the balance.

In this system, components are made of oil pump 33, air pump 25, air cylinder 4 and oil piston 3, air piston 40, sensors 17a, 17b, 17c and 17d, electronic control unit 41, air output exhaust 18, smart valves 11, and so on.

It is understood that the above description and drawings are illustrative of the present invention and that changes may be made in materials, method steps without departing from the scope of the present invention as defined in the following claims.

The invention claimed is:

1. An air shock absorber with smart suspension system with height adjustment for different vehicles comprising:
    four shock absorbers attached on each wheel of said vehicles; wherein each of said four shock absorbers comprises a smart barometer junction compressing air into each of said four shock absorbers; an air cylinder located between and around said smart barometer junction at one end and to a kickstand body at an opposite end, wherein said smart barometer junction is extended inside said air cylinder and is connected to an oil piston, and wherein an O-ring seals an opening where said smart barometer junction enters into said air cylinder, wherein said air cylinder further comprises an air piston located between said O-ring and said oil piston and wherein said oil piston is between said air piston and said kickstand body; said oil piston further comprises smart valves; wherein said air piston comprises an oil ring and two packing rubbers, wherein an oil located between said O-ring and one of said packing rubbers flows into said oil ring, lubricating and oiling said air piston; wherein a space between said air piston and oil piston comprises compressed air replacing need for any kind of coil for said four shock absorbers, said four shock absorbers lack any coil or spring means for height adjustment; wherein said oil piston is located between said compressed air and an oil piston fluid; wherein said oil piston fluid lubricates said oil piston; also said kickstand body comprises a kickstand fluid, freely moving in and out of said kickstand body adjusting a height of said four shock absorbers automatically and keeps a suspension of said vehicles in place; wherein each one of said four shock absorbers comprises a smart barometer, checking a pressure of said air cylinder, wherein said smart suspension system further comprises a control unit, and at least four sensors attached to each one of said four wheels; wherein said sensors send momentary change in road and vehicle condition to said control unit; wherein said system further comprises an air tank and an air pump, wherein said compressed air in each one of said four shock absorbers is provided for and adjusted under control of said control unit and through said air pump and air tank.

2. The air shock absorber system of claim 1, wherein when a load is placed inside said vehicles, a volume of said air cylinder decreases and therefore increase a pressure of said compressed air inside each one of said four shock absorbers and therefore activating their respective smart barometers, wherein said control unit, controls this change in pressure by sending air into said air cylinder via said air tank; therefore adjusting said vehicle height back to its normal height; and wherein when said load is lifted from said vehicles, due to excess air pumped inside said air cylinder said volume of said air cylinder increases, moving said air piston and therefore said pressure inside said air cylinder decreases, therefore said air cylinder pressure is adjusted via said smart barometer by exhausting said excess air via said control unit, therefore bringing back said vehicle back to its normal height.

3. The air shock absorber system of claim 2, when said vehicle is making a turn and tilts towards one side, a change in road condition is monitored by said four sensors and sent to said control unit, therefore said smart valves of said shock absorbers located on said tilting towards side is constricted or closed and said smart valves of said shock absorbers on the opposite side of said vehicle are opened in order to maintain a balance in said vehicle and adjust said vehicle height.

4. The air shock absorber system of claim 3, wherein during sudden brake, said smart valves in said shock absorbers located on a front of said vehicles are restricted and closed in order to maintain said vehicle height.

5. The air shock absorber air shock absorber of claim 4, wherein said system further comprises a manual mode controlled by a height adjustment chassis.

6. The air shock absorber of claim 5, wherein if said four sensors transmit information including imbalance of said vehicle or entering a hairpin, said control unit takes control of each of said wheels, and each of said four shock absorbers in order to pass an encountered crisis.

7. The air shock absorber system of claim 6; wherein when said system is functioning in said manual mode said oil pump is activated by pressing said chassis that connects to said control unit and said kickstand oil will be pumped into oil transmission pipes and said kickstand; wherein when said kickstand oil enters into said kickstand causes an increase in pressure inside said kickstand therefore moving said oil piston and said barometer junction upwards, therefore increasing said height of said vehicle.

8. The air shock absorber system of claim 7, wherein when said system is in said manual mode and during reduction of said height of said vehicle, said kickstand oil exits out from said kickstand and therefore said oil piston and therefore said barometer junction moves downwards by pressing said chassis, therefore said height of said vehicle will be reduced.

* * * * *